Figure 3:
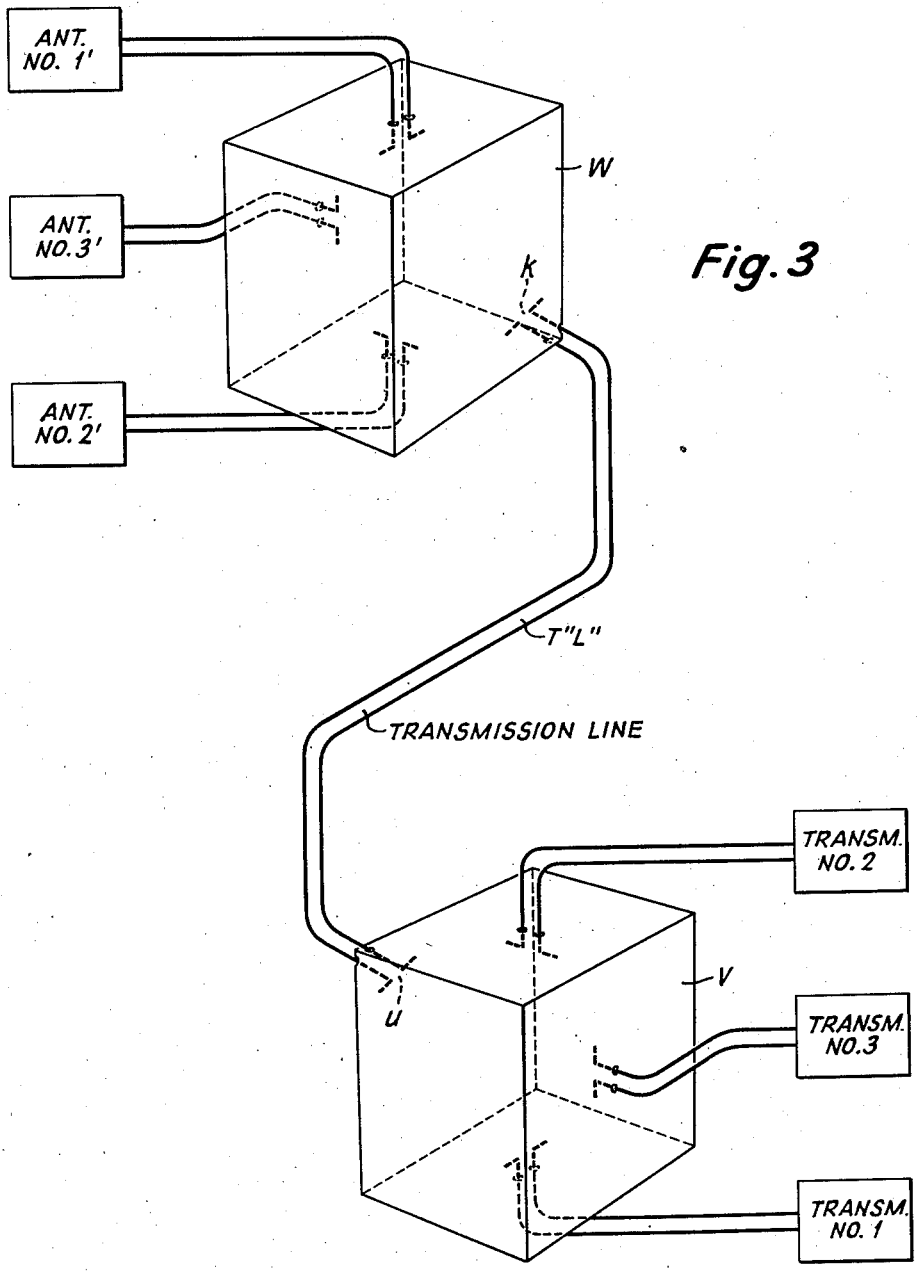

Dec. 21, 1943.                P. S. CARTER                2,337,184
                              COUPLING CIRCUIT
                          Filed Jan. 10, 1941.            2 Sheets-Sheet 1
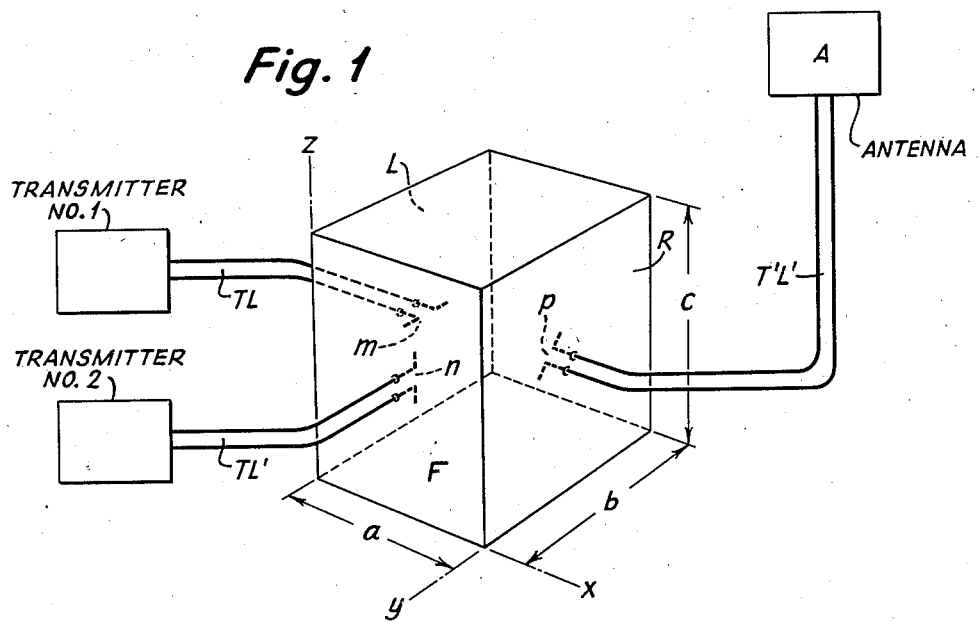
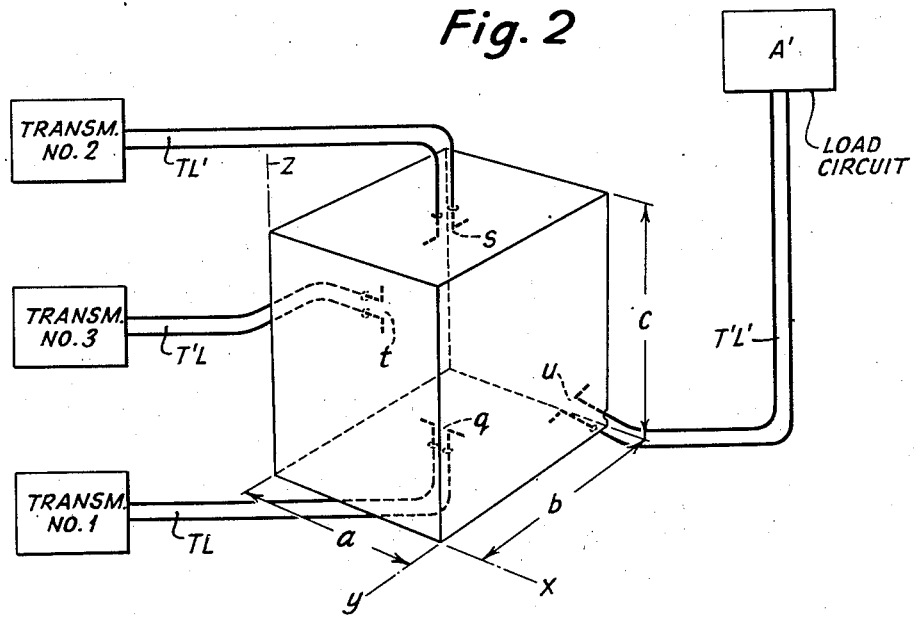
INVENTOR.
PHILIP S. CARTER
BY
ATTORNEY.

Dec. 21, 1943.     P. S. CARTER     2,337,184
COUPLING CIRCUIT
Filed Jan. 10, 1941     2 Sheets-Sheet 2

INVENTOR.
PHILIP S. CARTER
BY
ATTORNEY.

Patented Dec. 21, 1943

2,337,184

UNITED STATES PATENT OFFICE 2,337,184

COUPLING CIRCUIT

Philip S. Carter, Port Jefferson, N. Y., assignor to Radio Corporation of America, a corporation of Delaware Application January 10, 1941, Serial No. 373,955

13 Claims. (Cl. 178—44)

This invention relates generally to a circuit for coupling a plurality of sources of oscillation of different frequencies to a load in such manner that there is negligible, if any, interaction between the sources. Although the invention is particularly described with reference to an antenna system, it should be distinctly understood that this is mentioned in order to describe the principles of the invention, and not by way of limitation.

One of the objects of the present invention is to provide a radio system wherein two or three transmitters operating at different frequencies may be used simultaneously to excite the same load without interference with one another.

Another object is to provide a radio system wherein two or three transmitters of different frequencies may be used simultaneously to excite different antennas from a common transmission line, without interaction between the transmitters.

Other objects will appear from a reading of the following description.

In my copending application Serial No. 373,072, filed January 4, 1941, there is described a method of exciting different types of cavity resonators in such manner as to cause the existence in the resonators simultaneously of two or three types of waves. These types of waves are the fundamental modes of oscillation whose frequencies differ from one another by a predetermined percentage, depending upon the dimensions of the resonator. The manner in which the resonators are excited and the relations for determining the dimensions of these resonators are described in some detail in this copending application, for which reason it is believed necessary to repeat herein only so much of the theory of operation set forth in my copending application which is necessary for an understanding of the principles involved in the present invention. Although the present invention merely describes the use of rectangular prism resonators shown and described in more detail in connection with Figs. 1 and 2 of my copending application, it should be understood that these resonators are illustrative of the various types of resonators which can be used and that, if desired, the other types of resonator shown in my copending application can also be used to obtain the results of the present invention, provided that the same considerations described in my copending application be adhered to.

A better understanding of the invention may be had by referring to the following description, which is accompanied by drawings wherein Figs. 1, 2 and 3 illustrate three different embodiments of the invention.

Fig. 1 shows one manner in which two transmitters labeled 1 and 2 repectively, can be employed simultaneously to excite a common load, here shown as an antenna A by way of example, over a common transmission line T'L' with negligible or no interaction between the transmitters. In this figure, transmitters 1 and 2 are shown exciting a rectangular cavity resonator in such manner that there is caused to exist in the resonator two fundamental modes of oscillation whose frequencies correspond respectively to the frequencies of the two transmitters. This resonator is generally of the form described in Fig. 2 of my copending application, and its dimensions are so chosen that the fundamental modes of oscillation will have frequencies which differ from each other by the desired amount. The cavity resonator is shown as having sides $a$, $b$ and $c$, respectively parallel to the axes $x$, $y$ and $z$. The transmitter 1 is coupled to the resonator by means of a transmission line TL which enters the side L at its center to terminate in a small dipole $m$ within the resonator. The axis of the dipole $m$ is arranged parallel to the $y$ axis and excites in the resonator a standing wave oscillation in which the electric field is entirely horizontal and parallel to the $y$ axis. The transmitter 2 is connected to a transmission line TL' which enters the side F of the resonator at its center to terminate in a dipole $n$ within the resonator. The axis of dipole $n$ is arranged to be vertical and parallel with the $z$ axis, so that it excites a standing wave in the resonator in which the electric force is entirely vertical. The resonator is so designed that the wave whose electric field is parallel to the $y$ axis has a fundamental mode of oscillation whose frequency corresponds to the frequency of the transmitter 1, while the type of wave whose electric field is parallel to the $z$ axis has a fundamental mode of oscillation whose frequency corresponds to that of transmitter 2. It should also be understood that the dipoles $m$ and $n$ as arranged in Fig. 1 cannot excite any other types of waves than those in which the electric fields are respectively parallel to the $y$ and $z$ axes. In view of this, it will be apparent that the standing waves produced in the resonator by the dipoles $m$ and $n$ are independent of each other and hence do not interact upon each other. Because of the perpendicular positioning of the dipoles $m$ and $n$ with respect to each other, there is no direct coupling between these dipoles. The fundamental natural wavelength $\lambda y$ of the oscillation produced in the resonator by the dipole $m$ and having its electric field parallel to the $y$ axis, is given by the relation $$\lambda y = \frac{2ac}{\sqrt{a^2+c^2}}$$

The fundamental natural wavelength $\lambda z$ of the oscillation produced in the resonator by the dipole $n$ whose electric field is parallel to the $z$ axis is given by the relation $$\lambda z = \frac{2ab}{\sqrt{a^2+b^2}}$$

By properly proportioning the dimensions of the sides of the resonator, the natural frequencies of the two modes of oscillation can be made to have any desired value. The output of the resonator of Fig. 1 is taken by a transmission line T'L' which enters the face R at the center thereof and which is terminated in the resonator in a dipole $p$ which is given a slope of 45° to the horizontal and lies in a plane parallel to the face R. The axis of the dipole $p$ makes equal angles of 45° with the directions $y$ and $z$, and its plane is perpendicular to the direction $x$. With this arrangement the dipole $p$ will be excited equally by the electric field from both modes of oscillation of the resonator. The output transmission line T'L' connected to the dipole $p$ will carry the energy from the resonator to the load, here shown as an antenna A.

The coupling of the three transmission lines TL, TL' and T'L' to the waves in the resonator is kept quite small by using short dipoles $m$ and $n$ for excitation and also a short dipole $p$ for the output. This results in very sharp resonance curves and prevents coupling between dipoles $m$ and $n$ indirectly by way of dipole $p$.

Fig. 2 shows a system similar to that of Fig. 1, except that three transmitters 1, 2 and 3 of different frequencies are employed to simultaneously feed a load circuit A', such as an antenna, by way of a cavity resonator. Here the resonator is designed to have three natural fundamental modes of oscillation which correspond with the respective three frequencies of the transmitters 1, 2 and 3. This resonator is similar in form to the cavity resonator of Fig. 1 of my copending application, supra. This resonator has three different principal dimensions. Transmitter 1 is connected to transmission line TL, in turn coupled to the dipole $q$ which excites the resonator in the mode where the electric field is parallel to the $x$ axis. Transmitter 2 is connected to the transmission line TL' in turn terminated in the dipole $s$ which excites the resonator with a wave having its electric field parallel to the $y$ axis. Transmitter 3 furnishes excitation to the resonator by way of transmission line T'L and dipole $t$, the latter producing a wave having its electric field parallel with the $z$ axis. All three transmission lines from the transmitters 1, 2 and 3 enter the cavity resonator through different faces thereof at the respective centers thereof. The output energy is derived from the dipole $u$ which is so positioned that its axis makes equal angles with the directions of the three coordinate axes $x$, $y$ and $z$. This is accomplished by slanting the dipole $u$ so that its direction angle is 54.7° to the three directions $x$, $y$ and $z$. By arranging the dipole $u$ to have equal angles to the three directions $x$, $y$ and $z$, we are able to derive equal excitation from all three types of waves in the resonator. By changing this angle somewhat so that different angles are made between axes of the dipole $u$ and the directions $x$, $y$ and $z$, we are able to derive different excitations from the three waves within the resonator. The output transmission line T'L', which is coupled to the load A', which might be an antenna or any other suitable circuit, enters the resonator at one corner.

In Fig. 2 the three fundamental natural wavelengths $\lambda x$, $\lambda y$, $\lambda z$ corresponding to the three modes of oscillation in the resonator wherein the electric field is parallel to the $x$, the $y$ and the $z$ axes, respectively, are given by the following relations:

$$\lambda_x = \frac{2bc}{\sqrt{b^2+c^2}}$$

$$\lambda_y = \frac{2ac}{\sqrt{a^2+c^2}}$$

$$\lambda_z = \frac{2ab}{\sqrt{a^2+b^2}}$$

If these equations are solved under the assumption that $\lambda x > \lambda y > \lambda z$, there is obtained the following relations which give the lengths of the three sides of the cavity resonator for any particular three frequencies.

$$a = \frac{1}{\sqrt{2}} \frac{\lambda x \lambda y \lambda z}{\sqrt{\lambda x^2 \lambda y^2 - \lambda z^2 \lambda y^2 + \lambda x^2 \lambda z^2}}$$

$$b = \frac{1}{\sqrt{2}} \frac{\lambda x \lambda y \lambda z}{\sqrt{\lambda y^2 \lambda z^2 - \lambda x^2 \lambda z^2 + \lambda x^2 \lambda y^2}}$$

$$c = \frac{1}{\sqrt{2}} \frac{xyz}{\sqrt{\lambda x^2 \lambda z^2 - \lambda x^2 \lambda y^2 + \lambda y^2 \lambda z^2}}$$

It will be noted that the operation of the circuit of Fig. 2 is similar to that of Fig. 1 except, so to speak, for the addition of a third transmitter which excites a third fundamental frequency in the resonator.

Fig. 3 shows another embodiment of the present invention wherein three transmitters of different frequencies simultaneously excite a resonator V to produce three fundamental modes of oscillation whose frequencies correspond to the frequencies of the transmitters, the output from the resonator V being fed over a transmission line T"L" to another cavity resonator W in such manner that three different loads, such as antennas 1', 2' and 3', may be excited from the resonator W. In this embodiment, it is desired that the three loads 1', 2' and 3' be excited respectively at the frequencies of the three transmitters 1, 2 and 3 without any interaction between the transmitters. The cavity resonators V and W are identically dimensioned and similar to the cavity resonator of Fig. 2. The three transmitters 1, 2 and 3 serve, by means of their respective transmission lines and dipoles, to excite the output dipole $u$ and its associated transmission line T"L" at the frequencies of the three fundamental modes of oscillation set up in the resonator V. The three fundamental frequencies of oscillation derived from cavity resonator V are fed by means of transmission line T"L" into one corner of the cavity resonator W to cause the production of three fundamental modes of oscillation in cavity resonator W corresponding to the three frequencies in the line T"L". The dipoles in resonator W associated respectively with the loads 1', 2' and 3', are so arranged that they each derive from the cavity resonator the desired frequency. It should be noted that the output dipole $u$ for resonator V is so arranged that its axis makes equal angles with the directions of the three coordinate axes of cavity resonator V, and the input dipole $k$ of the cavity resonator W is similarly arranged that its axis makes equal angles with the directions of the three coordinate axes of the resonator W. The transmission line T"L" connecting the output dipole of cavity resonator V and the input dipole of cavity resonator W enters each of these cavity resonators at a corner, as shown. The transmission lines extending from the transmitters and from the loads to the cavity resonators V and W respectively enter these resonators at the centers of the different faces in the same manner as the transmission lines of Fig. 2 enter their associated cavity resonator.

In practice, it is often desired to operate a sound transmitter and television transmitter on the same antenna. The band width of a television signal may be of a substantial percentage of the carrier and one type of wave alone in a cavity resonator may result in an insufficient band width. Under such conditions the resonator of Fig. 2 may be arranged so that the television transmitter, let us say transmitter I, excites two types of waves in the resonator, the fundamental natural frequencies corresponding to said waves being made to differ by approximately two-thirds of the frequency band. The desired result is accomplished by properly proportioning the sides $a$, $b$ and $c$ and arranging the dipole $q$ differently from that shown in Fig. 2 and in such manner that it makes equal angles with the $x$ and $y$ axes. The method of obtaining the desired band width has been more fully described in my copending application Serial No. 373,072, filed January 4, 1941. Dipole $s$ and transmitter 2 are not used. Transmitter 3 feeding dipole $t$ is in this arrangement the sound transmitter which excites a wave whose electric field is entirely vertical and thus completely independent of the horizontal fields excited by the television transmitter.

The term "different types of waves" is used in the appended claims to designate waves whose electric fields are principally in different directions. Thus, in considering a hollow rectangular prism resonator the electric fields are at right angles to one another for the two or three different types of waves, while in a hollow ellipsoidal resonator the electric fields are principally in the directions of the three principal axes of the three principal cross-sections.

What is claimed is:

1. In combination, a plurality of sources of oscillations of different frequencies, a load, a cavity resonator interposed between said sources and said load, the dimensions of said resonator being such as to enable the production therein of modes of oscillation whose frequencies differ by a predetermined amount, elements within said resonator coupled to said sources and so arranged as to excite in said resonator different types of waves for the different freqencies of said sources, and another element within said resonator coupled to said load and so arranged as to pick up energy from the different types of waves produced within said resonator by said first elements.

2. In combination, a plurality of sources of oscillations of different frequencies, a load, a cavity resonator interposed between said sources and said load, dipoles within said resonator coupled to said sources and having their axes mutually perpendicular so as to excite in said resonator different types of waves for the different frequencies of said sources, and another dipole within said resonator coupled to said load and having its axis arranged so that said dipole is excited by all the different types of waves produced within said resonator.

3. In combination, a plurality of sources of oscillations of different frequencies, a load, a cavity resonator interposed between said sources and said load, dipoles within said resonator coupled to said sources and having their axes mutually perpendicular so as to excite in said resonator different types of maves for the different frequencies of said sources, and another dipole within said resonator coupled to said load and having its axis arranged to make substantially equal angles to the principal directions of the electric field components of the different types of waves produced within said resonator.

4. In combination, a plurality of loads adapted to receive oscillations of different frequencies, a multi-frequency source, a cavity resonator interposed between said loads and said source, said cavity resonator having such dimensions as to enable the production therein of modes of oscillation whose frequencies are related to the different frequencies of said source, an element within said resonator coupled to said source and arranged to excite in said resonator different types of waves for the different frequencies of the multi-frequency source, and other elements within said resonator coupled to said loads and arranged mutually perpendicular to one another to pick up energy from the different types of waves produced within said resonator by said first element.

5. Apparatus in accordance with claim 4, characterized in this that said elements are dipoles.

6. In combination, two sources of oscillations of different frequencies, a load, a hollow rectangular prism resonator interposed between said sources and said load, dipoles within said resonator coupled to said sources and having their axes mutually perpendicular so as to excite in said resonator different types of waves for the different frequencies of said sources, and another dipole within said resonator coupled to said load and having its axis arranged so that said dipole is excited by all the different types produced within said resonator, said dipoles being located substantially near the centers of different faces of said prism resonator.

7. In combination, three sources of oscillations of different frequencies, a load, a hollow rectangular prism resonator interposed between said sources and said load, dipoles within said resonator coupled to said sources and having their axes mutually perpendicular so as to excite in said resonator different types of waves for the different frequencies of said sources, and another dipole within said resonator coupled to said load and having its axis arranged so that said dipole is excited by all the different types produced within said resonator, said first dipoles being located substantially near the centers of different faces of said prism resonator, while said last dipole is located near that corner of said prism which is furthest away from said first dipoles.

8. In combination, a plurality of sources of oscillations of different frequencies, a load, a cavity resonator interposed between said sources and load, the dimensions of said resonator being so chosen that it possesses fundamental modes of oscillation of different frequencies which correspond to the frequencies of said source, elements within said resonator coupled to said sources and so arranged as to excite in said resonator said fundamental modes of oscillation corresponding to the different frequencies of said sources, and another element within said resonator coupled to said load and arranged to pick up energy of said modes of oscillation from the waves produced within said resonator.

9. In combination, a high frequency cavity resonator comprising a hollow closed electrically conducting body having at least two different principal dimensions differing by a predetermined amount, means for exciting said resonator in its interior in such manner that there is caused to exist in said resonator two fundamental modes of oscillation, said means including a pair of elements in the interior of said resonator positioned in planes perpendicular to each other and a pair of sources of oscillation located externally of said resonator and coupled to said elements, an element in said resonator positioned to pick up energy of said two modes of oscillation, and a load coupled to said last element.

10. A combination of elements as defined in claim 9, characterized in this that said cavity resonator is a rectangular prism.

11. In combination, two sources of oscillations of different frequencies, a load, a hollow rectangular prism resonator interposed between said sources and said load, dipoles within said resonator coupled to said sources and having their axes mutually perpendicular so as to excite in said resonator different types of waves for the different frequencies of said sources, and another dipole within said resonator coupled to said load and having its axis arranged so that said dipole is excited by all the different types of waves produced within said resonator, said first dipoles being located substantially near the centers of different faces of said prism resonator, while said last dipole is located near the center of a third face of said resonator.

12. In combination, two sources of oscillations of different frequencies, a load, a hollow rectangular prism resonator interposed between said sources and said load, wave exciting elements within said resonator coupled to said sources and having their axes mutually perpendicular so as to excite in said resonator different types of waves for the different frequencies of said sources, and a coupling element within said resonator coupled to said load and having its axis arranged so that said coupling element is excited by all the different types produced within said resonator, said wave exciting elements being located substantially near the centers of different faces of said prism resonator.

13. In combination, two sources of oscillations of different frequencies, a load, a hollow rectangular prism resonator interposed between said sources and said load, wave exciting elements within said resonator coupled to said sources and having their axes mutually perpendicular so as to excite in said resonator different types of waves for the different frequencies of said sources, and a coupling element within said resonator coupled to said load and having its axis arranged so that said coupling element is excited by all the different types produced within said resonator, said wave exciting elements being located substantially near the centers of different faces of said prism resonator, said coupling element being located near one corner of said resonator.

PHILIP S. CARTER.